G. W. PUTNAM.
Butter Worker.
No. 34,592.  Patented March 4, 1862.
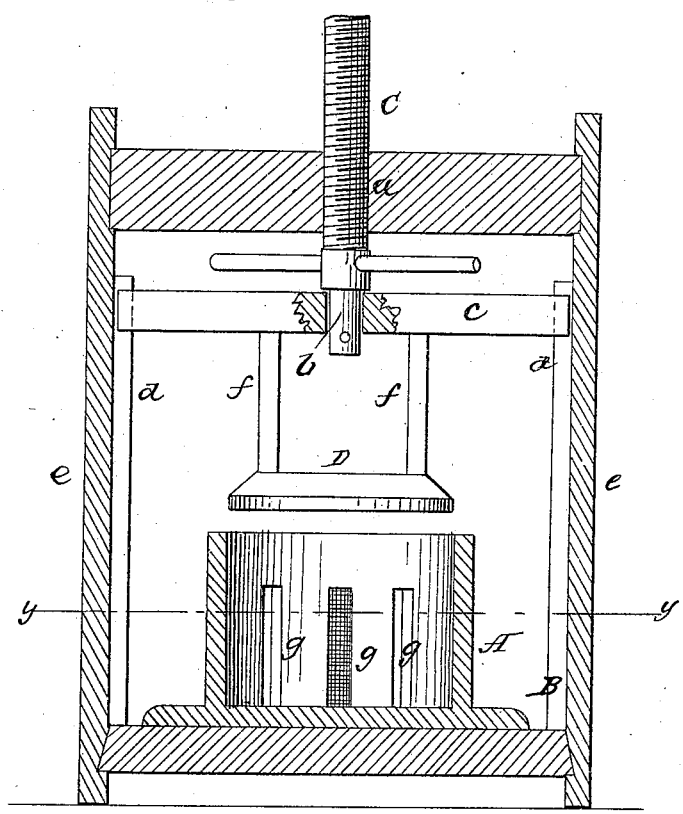
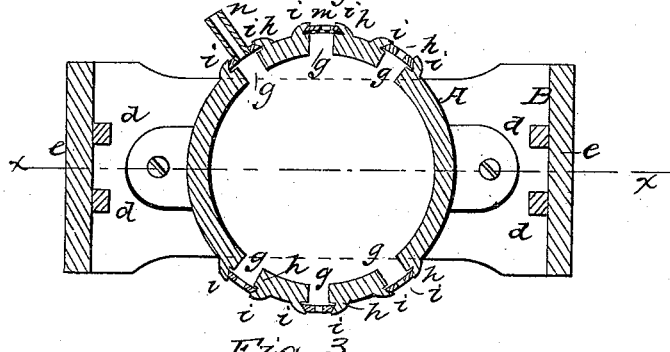
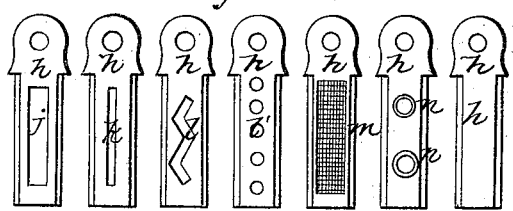

UNITED STATES PATENT OFFICE.

GEORGE W. PUTNAM, OF SMITHFIELD, NEW YORK.

IMPROVED DEVICE FOR PURIFYING BUTTER.

Specification forming part of Letters Patent No. 34,592, dated March 4, 1862.

*To all whom it may concern:*

Be it known that I, GEORGE W. PUTNAM, of Smithfield, in the county of Madison and State of New York, have invented a new and useful Improvement in Working or Purifying Butter; and I do hereby declare that the following is a full, clear, and exact description of the same, reference being had to the annexed drawings, making a part of this specification, in which—

Figure 1 is a vertical central section of my invention, taken in the line $x\,x$, Fig. 2; Fig. 2, a horizontal section of same, taken in the line $y\,y$, Fig. 1; Fig. 3, a detached view of slides pertaining to same.

Similar letters of reference indicate corresponding parts in the several figures.

To enable those skilled in the art to fully understand and construct my invention, I will proceed to describe it.

In carrying out this invention I employ a vessel A, which may be of cylindrical form and secured in the lower part of a framing B, in the upper part of which a vertical screw C is fitted in a female thread $a$. The screw C is directly over the center of the vessel A, and the lower part of the screw C is provided with a round tenon $b$, which is fitted in a cross-bar $c$, the ends of which work between vertical guides $d\,d$ at the inner sides of uprights $e\,e$ of the framing B. To the cross-bar $c$ there are attached two pendants $f\,f$, which have a plunger D secured to their lower ends. The plunger D fits the interior of the vessel A, and may be forced down thereon by turning the screw C. The vessel A and plunger D may be of wood or metal or other suitable material.

In the lower part of the vessel A there are a series of openings $g$, each of which is provided with a slide $h$. These slides are fitted between dovetail cleats or projections $i\,i$ at the outer side of the vessel A, so that they may be readily adjusted over the openings $g$ and removed from them. Each slide $h$ is perforated either with straight or zigzag slots or holes, as shown at $j\,k\,l\,l'$ in Fig. 3; or the slides may have large slots made in them, covered with wire-cloth, as shown at $m$. Tubes $n$ may also be inserted in the slides, if desired. These openings in the slides, of whatever form they may be, are for one and the same purpose—viz., they serve as eduction passages or strainers, as will be hereinafter described.

The operation is as follows: The plunger D is raised above the vessel A by turning the screw C, and the butter, after being taken from the churn and allowed to remain sufficiently long to give it a proper degree of consistency, is placed in the vessel A and the plunger D is forced down upon it by operating the screw C, which may be done by any convenient power. As the plunger D descends, the butter will of course be forced out through the slots, holes, screens, or tubes in the slides $h$ in the vessel A, and the particles of butter in being thus acted upon will be made to adhere together, while the buttermilk, brine, and other liquids or semi-liquids will be strained out or separated from the butter.

By this invention and improvement it will be seen that there is a continuous motion and discharge of the butter through the openings in the slides, and these openings are of such dimensions as to cause the butter to be subjected to a requisite pressure to effect the desired result. The openings are made in slides $h$, so as to admit of larger or smaller ones being used, as the quality or state of the butter may require. The work may not only be very expeditiously done, but done also in a thorough or perfect manner. The buttermilk and other liquids will pass out through the openings with the butter; but the liquids, on emerging from the vessel A, will fall perpendicularly, while the butter will continue to pass on in a more horizontal direction and may be received on a board or in a bowl. Thus the proper separation takes place between the butter and the liquids.

I do not claim, broadly, the pressing of butter by a piston for the purpose of extracting the buttermilk and other liquids, nor do I claim, broadly, the use of a vessel perforated so as to permit the escape of the buttermilk while retaining the butter.

Having thus described my invention, what I claim as new, and desire to secure by Letter Patent, is—

Having the vessel A provided with butter-escape openings $g$, in combination with the adjusting perforated slides $h$, substantially as herein shown and described, for the purpose set forth.

GEORGE W. PUTNAM.

Witnesses:
  CALEB CALKINS,
  JOSEPH MARSH.